United States Patent
McCurdy et al.

(10) Patent No.: US 9,633,047 B2
(45) Date of Patent: Apr. 25, 2017

(54) STORY FLOW SYSTEM AND METHOD

(75) Inventors: Kevin McCurdy, Menlo Park, CA (US); Greg Tatem, Moraga, CA (US); Howard Field, Menlo Park, CA (US)

(73) Assignee: PICABOO CORPORATION, Menlo Park, CA (US)

( * ) Notice: Subject to any disclaimer, the term of this patent is extended or adjusted under 35 U.S.C. 154(b) by 1223 days.

(21) Appl. No.: 12/237,257

(22) Filed: Sep. 24, 2008

(65) Prior Publication Data

US 2009/0158183 A1     Jun. 18, 2009

Related U.S. Application Data

(60) Provisional application No. 60/975,406, filed on Sep. 26, 2007.

(51) Int. Cl.
  *G06F 3/048* (2013.01)
  *G06F 17/30* (2006.01)
(52) U.S. Cl.
  CPC ............... *G06F 17/30265* (2013.01)

(58) Field of Classification Search
  CPC .................................. H04N 1/00196
  USPC ....................... 715/764, 765, 730
  See application file for complete search history.

(56) References Cited

U.S. PATENT DOCUMENTS

| | | | |
|---|---|---|---|
| 5,283,864 A * | 2/1994 | Knowlton | 715/776 |
| 7,675,635 B2 * | 3/2010 | Tsue et al. | 358/1.13 |
| 7,689,909 B1 * | 3/2010 | Szuszczewicz | 715/243 |
| 2007/0019932 A1 | 1/2007 | King et al. | |
| 2007/0124325 A1 | 5/2007 | Moore et al. | |

OTHER PUBLICATIONS

PCT/US2008/077744 International Search Report, dated Dec. 2, 2008.
PCT/US2008/077744 Written Opinion, dated Dec. 2, 2008.

\* cited by examiner

*Primary Examiner* — Omar Abdul-Ali
(74) *Attorney, Agent, or Firm* — DLA Piper LLP (US)

(57) ABSTRACT

A story flow system and method are provided that allows a user to upload and organize a set of content into an album.

14 Claims, 5 Drawing Sheets

STORY FLOW SYSTEM AND METHOD

PRIORITY CLAIM

This application claims priority of and the benefits under 25 USC 119(e) to U.S. Provisional Patent Application Ser. No. 60/975,406 filed on Sep. 26, 2007 and entitled "Story Flow System and Method", the entirety of which is incorporated herein by reference.

FIELD

A system and method for laying out, organizing and assembling one or more pieces of content into a storybook.

BACKGROUND

Systems and method that permit a user to organize a plurality of pieces of content are known. For example, the Picture Manager utility in Windows® allows a user to view a plurality of digital images, arrange the digital images and then view the plurality of digital images as a slide show. In addition, one can use Microsoft® Powerpoint® to generate and arrange a series of slides wherein each slide can contain one or more digital images so that a slideshow with the slides containing the digital images is generated. In addition, video editing system (both high end movie studio type systems and consumer systems) exist that allow a user to put together clips of video images into a movie or other video show.

However, no existing system is capable of organizing a plurality of images into a story and then allowing the user to generate a bound book wherein the layout of the images in the bound book is shown to the user via a story flow interface and it is to this end that the system and method are directed.

DETAILED DESCRIPTION OF ONE OR MORE EMBODIMENTS

The system and method are particularly applicable to a web-based story flow system that is incorporated into a web-based photo book system and it is in this context that the system and method will be described. It will be appreciated, however, that the system and method have greater utility since the system and method can be implemented in different manners than disclosed below and may be used as a independent system (not part of the web-based photo book system), as a desktop application that is connected to the Internet and a web site (such as the photo book system, or with other systems in which it is desirable to be able to preview, assemble and generate a bound book of digital images. In an exemplary embodiment, the story flow system is part of a web-based photo book system that is accessible on the web at www.picaboo.com. Now, an exemplary implementation of the story flow system and method are described for illustration purposes.

Figure 1:
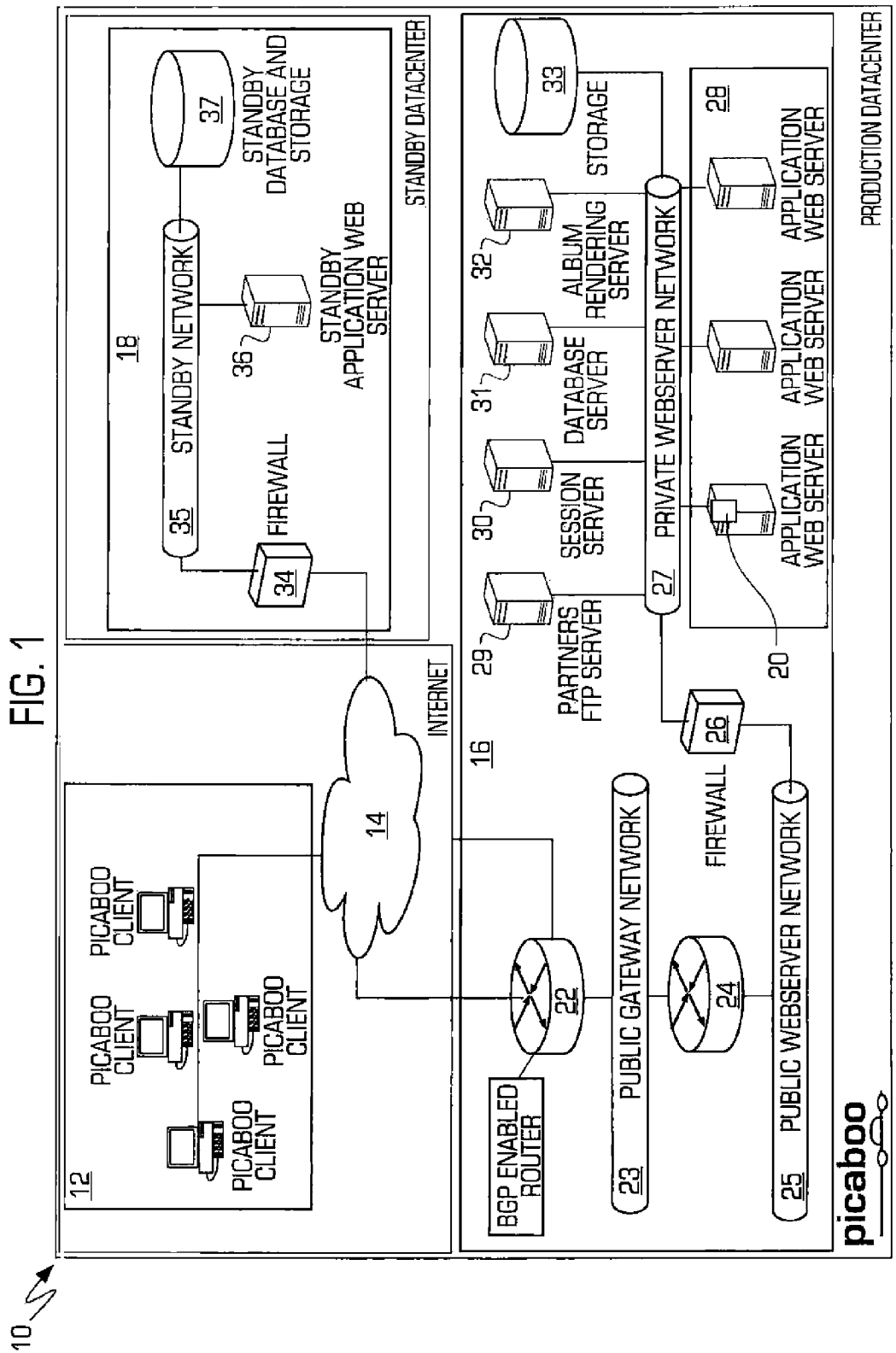
FIG. 1 illustrates an example of a web-based system that includes a story flow system.

FIG. 1 illustrates an example of a web-based system 10 that includes a story flow system 20. The web-based system, that may be a photo book system of Picaboo (www.picaboo.com) may include one or more computing devices 102 (such as the plurality of Picaboo clients as shown in FIG. 1) that may each be a processing unit based device with sufficient memory, display capabilities, storage space. processing power and connectivity (wired or wireless) to access and interact with a photo system 16 over a communications link 14 (wired or wireless). For example, each computing device may be a personal computer, laptop computer, desktop computer, a wireless device, a wireless email device, an integrated device such as a RIM Blackberry or Palm Treo device, a mobile phone or a cellular phone. The system 16 may also include a standby portion 18 (also coupled to the communications link 14) that may be used if there is a failure of any portion of the main system. The system 16 may include a typical router device 22, a public gateway network 23 and a second router device 24 that is in turn coupled to a public webserver network 25. The public webserver network 25 is in turn connected to a firewall device 26 that protects the internal network from malicious activities by having all data into and out from the internal systems pass through the firewall. The internal systems (that are behind the firewall) may include a private webserver network 27 and one or more application web servers 28 (one or more of which may execute the story flow system 20 that may be implemented in software in one embodiment) that receive requests and information from the computing devices and generate one or more web pages that contain information that can be displayed in a known browser application being executed by each computing device. The system may also include a known FTP server 29, a known session server 30, a known database server 31 that receives data requests, queries a storage unit 33 (that stores the various data and information associated with the photo system and the story flow system 20) and delivers the requested data to the appropriate system element and an album rendering server 33 that renders the bound image albums that are produced by the photo system. The standby system 18 (used in the event of a failure or downtime of the main system) may include a firewall 34, a standby network 35, a standby application web server 36 and a standby database and storage 37. The photo system 16 may be used to upload images and then generate a photo album based on the uploaded images of the user.

The story flow system 20 permits the user, once they have uploaded the images, to use a graphical user interface representing a number of page spreads to organize images of the user. The images may be digital images, scanned photographs, line art and the like. The story flow system may also group, images imported from a particular storage device of the user, images based on the amount of time that elapsed between those images and group the images based on a cascading window of time intervals as described below in more detail with reference to FIG. 5. The story flow system also allows the user to drag a graphical representation of a page spread divider to allow the user to easier change the groupings of images on each page spread. The story flow system also allows the user to move images between the graphical representations of the page spreads and thus to different pages of the bound book that is the end product of the photo system. The story flow system also allows the user to rearrange page spreads (two facing pages in the bound book) or the pages within a page spread to a different location or to a different page spread.

In one embodiment of the photo system, the components of the system shown in FIG. 1 are implemented with the following commercial products:
Firewall
    ASA5510
DMZ Layer 2/3
    DLink DES-3326SR
Internal Layer 2
    Dell PowerConnect 5324
Machine1
    Hardware
        IBM 345 (2× Four way Xeon P4 2.8 GHZ)
        1.5 Gb RAM
        Raid 1 2×34 GB
    Applications
        Picaboo Administration
        Picaboo Server Configuration
        Picaboo Public Proxy module
        Picaboo Account Verification module
        Picaboo Maintenance Service
        Picaboo Verisign Module
        Picaboo Web Module
        Picaboo File Transfer Module
        Picaboo Preview
        MSQueue Sendmail Service
        Logger
        SRS2 (Renderer)
Machine2
    Hardware
        Dell SC1425 (2× Xeon P4 2.8 GHZ)
        2 Gb RAM
        Raid 1 2×80 GB
    Applications
        Picaboo Private Proxy module
        MSSQL Server (Standby)
        Picaboo Verisign Module
        Picaboo Web Module
        Picaboo File Transfer Module
        Picaboo Preview
        Logger
        Community
Machine3
    Hardware
        Dell SC1825 (2× Xeon P4 3 GHZ)
        2 Gb RAM
        1×36 GB
    Applications
        Picaboo Verisign Module
        Picaboo Web Module
        Picaboo File Transfer Module
        Picaboo Preview
        Logger
        Backgrounds
        SRS2 (Renderer)
Machine4
    Hardware
        Dell SC1425 (2× Xeon P4 2.8 GHZ)
        2 Gb RAM
        Raid 1 2×80 GB
    Applications
        SRS2 (Renderer)
        MSSQL Server
Machine5
    Hardware
        Dell Powervault 745N (Xeon P4 2.8 GHZ)
        1 Gb RAM
        Raid 5 3×600 GB
    Applications
        Filecache Machine 2 (shown above) may provide the following resources to internal network servers:

| | |
|---|---|
| albumOrders: | Used to store album order files. |
| dvdOrders: | Used to store dvd order files. |
| Preview: | Used to store thumbnails and preview pages. |
| printOrders: | Used to store print order files. |
| Templates: | Used to store email template and images. |
| Templates2: | Hi res templates used by SRS2. |
| PicabooCache: | Used to store Picaboo album files. |
| Backgrounds: | Used to store backgrounds uploaded. |
| RPIBackup: | Backup of RPI orders |
| Uploads: | Used to store community uploads. |

The main client application (that interacts with Picaboo clients in FIG. 1) is the Picaboo application. The web application is this implementation may include the private proxies, account verification, file transfers, order pages and/or preview. The server application in the implementation may include album publishing, image extraction, data synchronization, rendering, user gateway, user registration and the session server.

An implementation of the story flow system may include the following software modules that perform the following functions:
StoryFlow Main—the main story flow application module that controls/calls the other modules
    DataStore—stores data associated with the story flow system
    MediaHQManager—manages the media/images in the story flow system
    PageEntry—manages the entry of pages into the story flow system
    PhotoEntry—manages the entry of images into the story flow system
    StoryFlowControl—manages the story flow process (shown in FIG. 3 below)
    StoryFlowData—stores the data associated with the story flow process An implementation of the story flow system may also support the following commands:
StoryFlow Commands
    CmdAddPhotos—adds a new image to the story flow system
    CmdDragPhotos—allows the user to drag images in the story flow system
    CmdDragSplitter—allows the user to move the page separators in the story flow system
    CmdInsertPage—allows the user to add a new page into the story flow system
    CmdDragPage—allows the user to drag a page in the story flow system
    CmdRemovePage—allows the user to delete a page in the story flow system
    CmdRemovePhoto—allows the user to delete an image from the story flow system
    CmdSetTitlePage—allows the user to set a title text for a page An implementation of the story flow system may also include layout commands/modules that include:
StoryFlow Layout
    LayoutStore—stores the layout for each album of the story flow system PageSegmentLayout—manages and stores the layout for each page in each album PhotoLayout—manages and stores the layout of each image on each page SpreadSegmentLayout—manages and stores the layout of each page spread of each album The story flow system may also include data types that are associated with the story flow system that may include a theme data type, a background data type, a layout data type, a media wells data type and/or a caption data type.

Themes

Themes are a data structure that contain collections of backgrounds and layouts. Examples of themes include a travel theme where background images include collages of postage stamps, bamboo, etc. . . . The travel theme layouts are angled and fun, with caption boxes for the user to tell the story of their trip.

Backgrounds

Backgrounds are images that are displayed in a z-order behind the layouts.

Layouts

Figure 2:
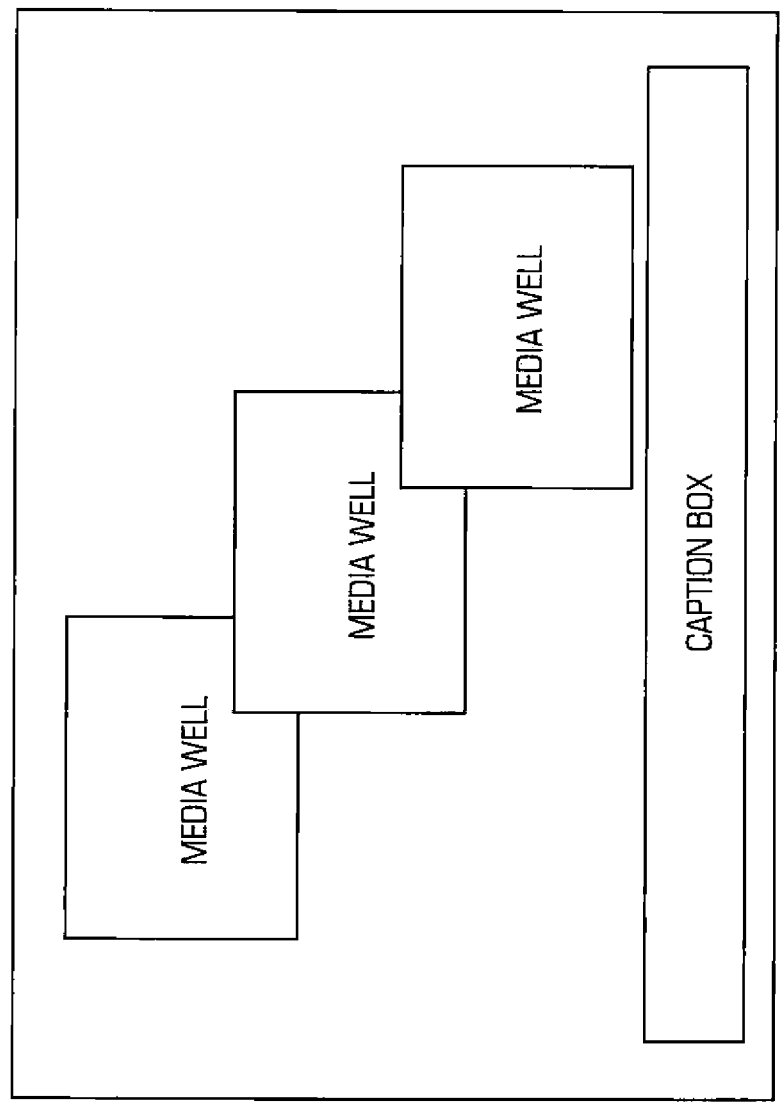
FIG. 2 illustrates an example of the data structures associated with the story flow system.

Layouts consist of Media Wells, and Caption Boxes as shown in FIG. 2.

Media Wells

Media Wells are rectangles that position the image on the album page. Media Wells can have optional borders and shadows applied to them. There can be n-number of Media Wells in a layout. Media Wells can be angled or straight, portrait or landscape. Media Wells can be of various sizes.

Caption Boxes

Caption Boxes are rectangles positioned on the layout to provide the user a defined area in which the user can type text. Caption Boxes are of various sizes and number.

Figure 3:
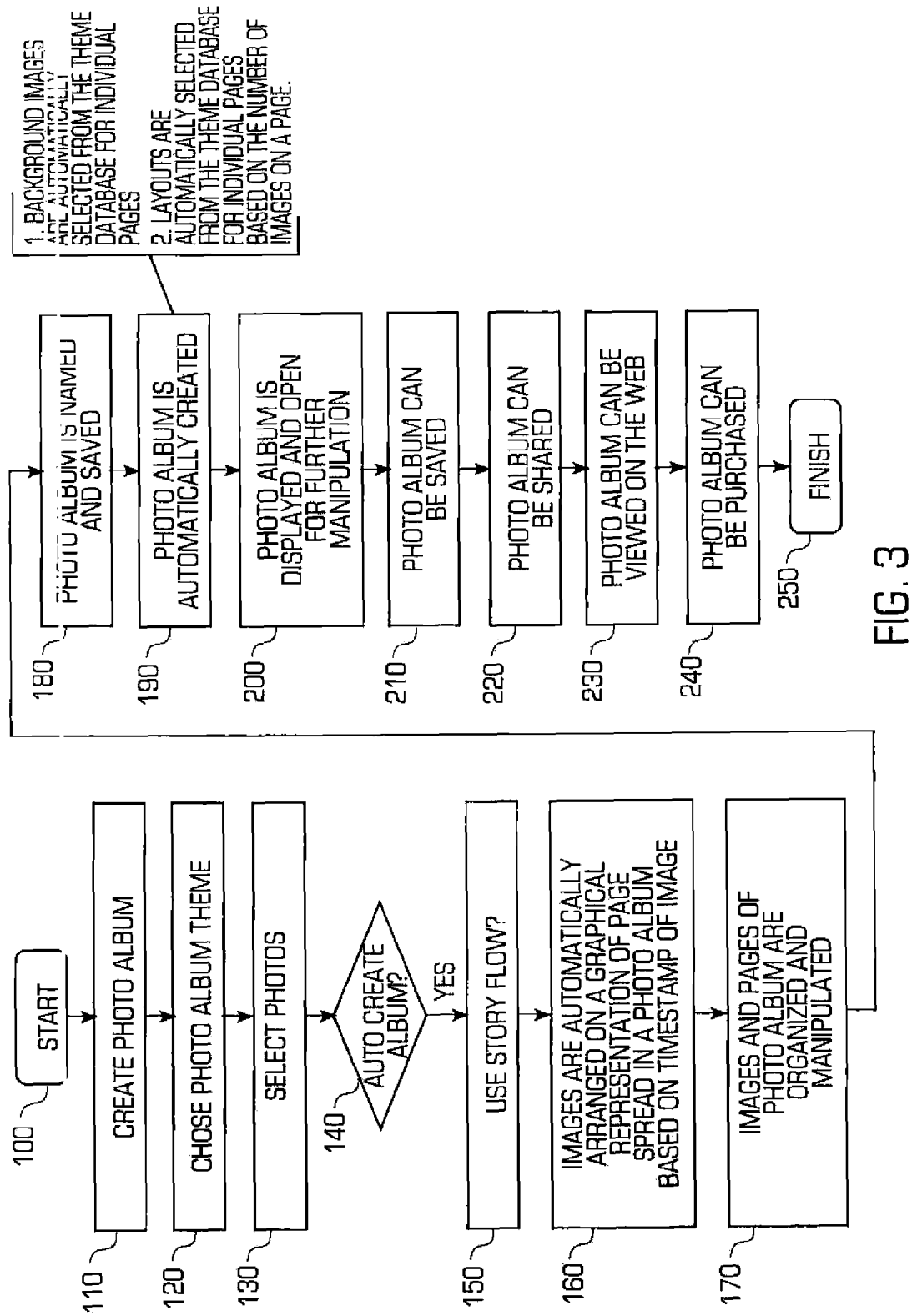
FIG. 3 illustrates an example of a method for a story flow process.

FIG. 3 illustrates an example of a method for a story flow process 100 that is implemented by the story flow system and its modules and elements. The story flow system allows the user to elect to create a new photo album (110) with user content from various locations including other photo sharing sites, other photo/image storage sites and/or a user's storage device such as a hard disk drive, flash drive, USB drive and the like. The user may then select a photo album theme (120) and then the user selects their photos/images (130) and enters StoryFlow. If the user selects to auto create an album (140) and elects to use story flow to generate the album (150), then the story flow detailed process begins.

Figure 4:
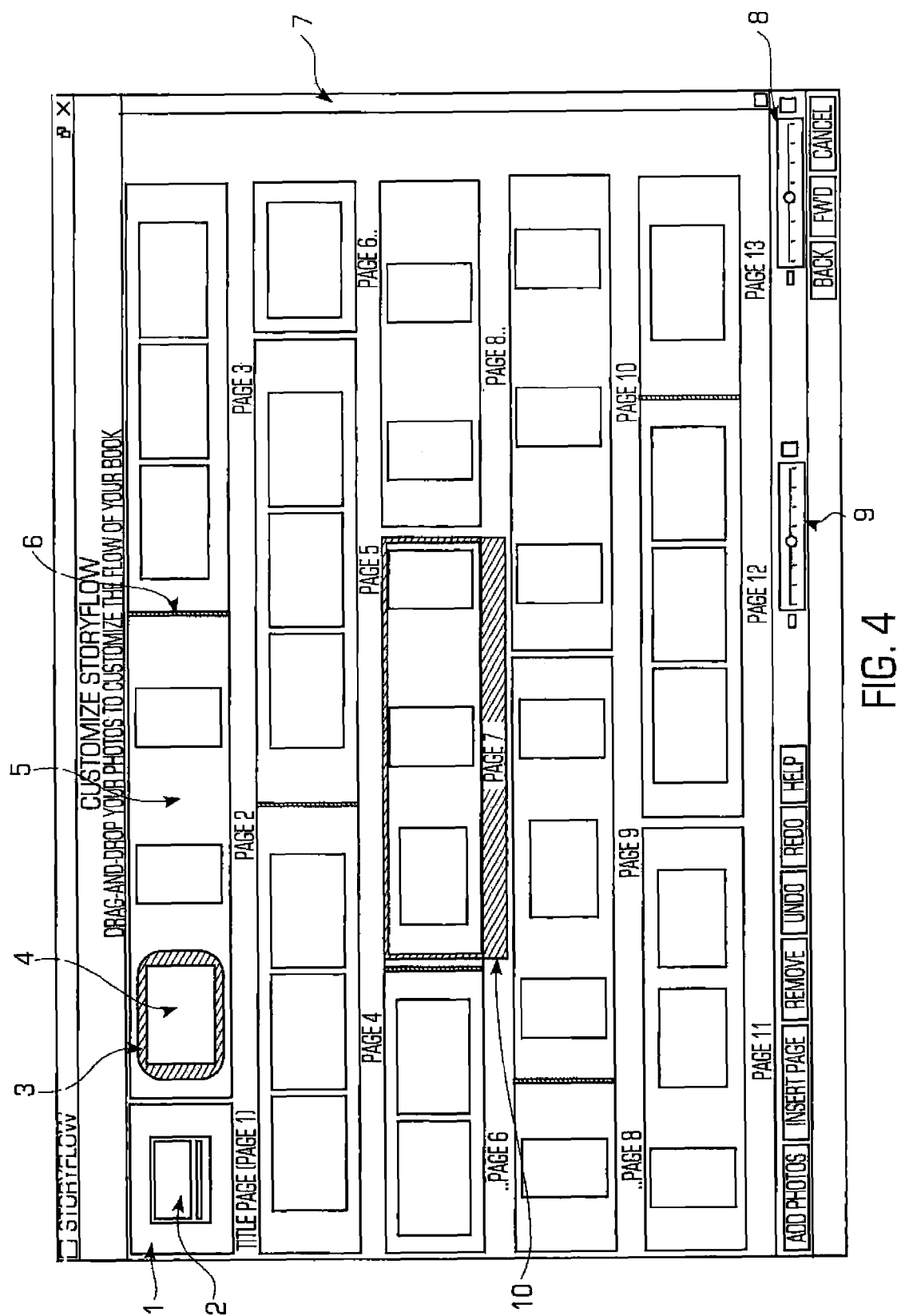
FIG. 4 illustrates an example of a user interface of the story flow system.

The selected photos/images/content of the user are displayed as thumbnails in both landscape and portrait (4 as shown in FIG. 4) on a graphical representation of a page spread in a photo album (5 as shown in FIG. 4) based on the DateTaken property of the photo (160). In one embodiment, the photos/images/content may be uniquely grouped by a cascading grouping process that is described in more detail below with reference to FIG. 5. The user, using the story flow process, can organize and manipulate the pages of the photo album (170), name and save the photo album (180). Then, the photo album for the user is automatically generated (190) in which background images are automatically selected from a theme database for the individual pages of the album and/or layouts are automatically selected from the theme database for individual pages based on the number of images on each page. Then, the photo album is displayed and opened for further manipulation (200). Then, the user can save the photo album (210) and can also be shared (220). The system then allows the user to be viewed on the web (230) and the photo album can be purchased (240) to complete the bound book photo album.

During the image and pages manipulation, a graphical representation of the cover of the book is presented (1 in FIG. 4) and the user can drag and drop a photo into the die-cut to place the image in the title page. A plurality of photos can be dragged and dropped across pages in the book. When the user selects a photo to be dragged and dropped it is highlighted (3 in FIG. 4). When the user drags the photo(s) across the screen the image(s) are ghosted such that only a faint transparent image(s) is seen. A single page can be dragged and dropped onto any other page in the book. Its highlighted state is shown in (10 in FIG. 4). When the user drags the page across the screen the page is ghosted such that only a faint transparent page is seen. A slider can be dragged (6 in FIG. 4) to move pictures to the right or left side of the page spread. The size of the pages of the book and the images included in the pages can be varied by using the page size slider (8 in FIG. 4). The main image window can be scrolled up and down by using the scrollbar (7 in FIG. 4).

Figure 5:
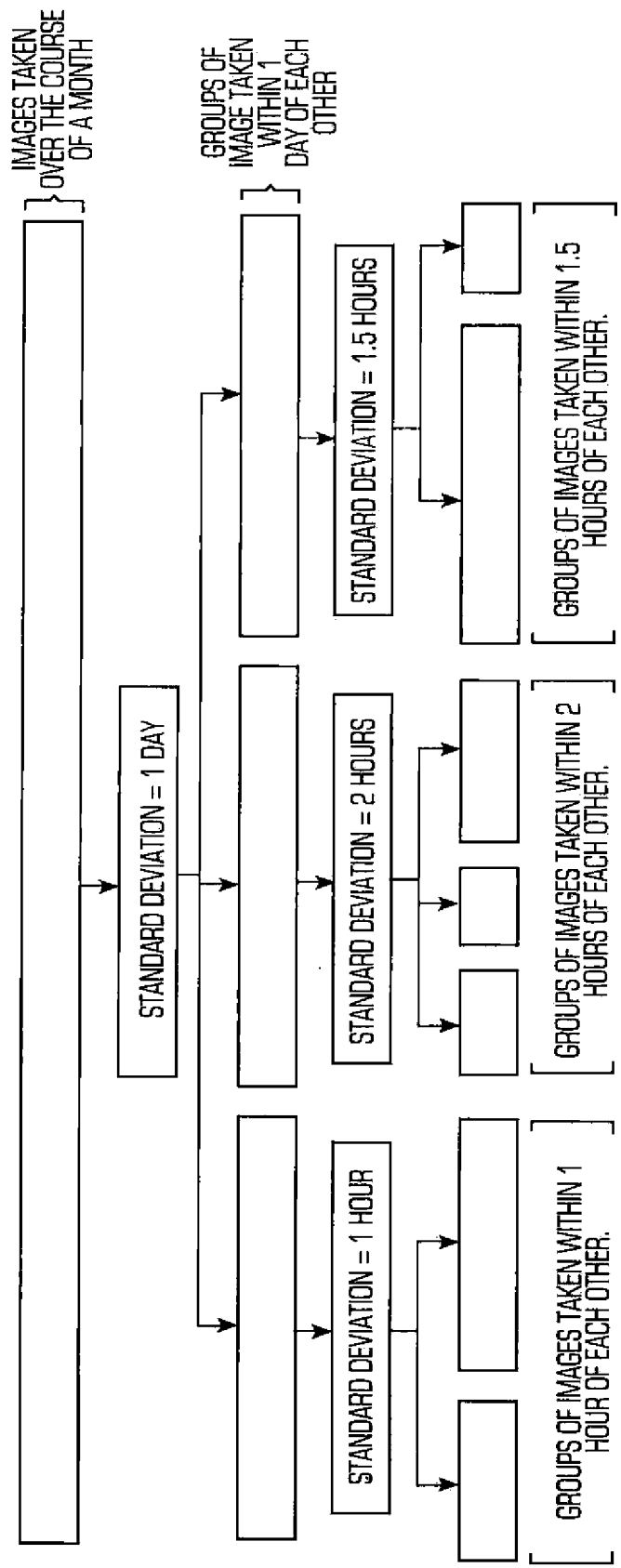
FIG. 5 illustrates an example of an implementation of a cascading group method that may be part of the story flow system.

FIG. 5 illustrates an example of an implementation of a cascading group method that may be part of the story flow system. The cascading group method is performed on a set of images/content/pictures selected by the user (130 in FIG. 3). In the cascading group method, the value of the Date Taken property of each image file is stored in an array sorted by time. The standard deviation is then calculated on the entire array. The array is then grouped into smaller arrays of images based on the interval of time from one image to the next. For example, a user selects a set of images that are created over the course of month. The standard deviation of this population of images is calculated and found to be 1 day. Images are then grouped together in smaller arrays that were taken less than 1 day apart from each other. Each group is then evaluated using the same process and, if needed, split into smaller groups. The number of times images are split into smaller groups is adjustable by the user using the slider 9 shown in FIG. 4.

Each group of images/content/pictures is then placed on a page spread in the book by dividing the group into two (left page and right page of the spread). To accomplish this, the method finds the maximum time interval in the series and then iterates through the array putting images into the left page array that have intervals less than the maximum interval value. When the maximum interval is found the right page array is then used to store the rest of the images. In this manner, the cascading group method automatically initially places each piece of content/image/picture into the album so that the user can then manipulate those images.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A content system, comprising:
a computer based content system;
a story flow unit that is part of the computer based content system;
the story flow unit allows a user to organize a set of content into an album having one or more page spreads with each page spread having one or more media wells for one or more pieces of content; and
the story flow unit further comprises a content unit that allows the user to place a piece of content into one of the one or more media wells on a page spread and a page unit that allows the user to place and manipulate a position of the page spread with the user content in the album and allows the user to drag a page spread divider to change a grouping of content on each page spread.

2. The system of claim 1, wherein the story flow unit further comprises a cascading group unit that automatically organizes a set of pieces of content based on a timestamp associated with each piece of content.

3. The system of claim 1 further comprising an album renderer unit that generates a bound book album assembled using the story flow unit.

4. The system of claim 1 further comprises one or more computing devices that access the content system over a link and wherein the content system further comprises one or more server computers and the story flow unit further comprises a plurality of lines of computer code executed by the one or more server computers.

5. The system of claim 4, wherein each computing device further comprises a personal computer, a laptop computer, a desktop computer, a wireless device, a wireless email device, an integrated device, a mobile phone or a cellular phone.

6. The system of claim 1, wherein the content unit further comprises a caption box that permits a user to place text into the caption box wherein the text will be printed on the pages of the album.

7. The system of claim 1, wherein each piece of content further comprises a photo.

8. A computer implemented content method using a content system having a story flow unit that is part of the content system, the method comprising:

selecting one or more pieces of content and a photo album;

displaying a blank photo album having one or more page spreads in a story flow wherein each page spread has one or more media wells for images;

displaying, in the story flow, the one or more pieces of content as thumbnails;

placing a selected piece of content into a media well on each page spread;

manually manipulating the order of the pages spreads with the selected piece of content in the album to product a photo album; and dragging a page spread divider to change a grouping of content on each page spread.

9. The method of claim 8 further comprising automatically organizing the one or more pieces of content based on a timestamp associated with each piece of content.

10. The method of claim 8 further comprising generating a bound book album assembled using the story flow unit.

11. The method of claim 8, wherein the content unit further comprises a caption box that permits a user to place text into the caption box wherein the text will be printed on the pages of the album.

12. The method of claim 8, wherein each piece of content further comprises a photo.

13. The content system of claim 1, wherein the page unit allows the user to change one of the order of the pages in the album and the size of each page in the album.

14. The content system of claim 1, wherein the content unit manipulates the order of page spreads by one of changing the order of the page spreads in the album and changing the size of each page spread in the album.

* * * * *